United States Patent
Quinlan et al.

(10) Patent No.: US 9,740,862 B1
(45) Date of Patent: Aug. 22, 2017

(54) IDENTIFYING MALWARE BASED ON A RELATIONSHIP BETWEEN A DOWNLOADER FILE AND A DOWNLOADED FILE

(71) Applicant: Juniper Networks, Inc., Sunnyvale, CA (US)

(72) Inventors: Daniel J. Quinlan, San Francisco, CA (US); Kyle Adams, Brisbane, CA (US); Jacob Asher Langton, Oakland, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 147 days.

(21) Appl. No.: 14/753,259

(22) Filed: Jun. 29, 2015

(51) Int. Cl.
*G06F 21/00* (2013.01)
*G06F 21/56* (2013.01)
*G06F 21/53* (2013.01)

(52) U.S. Cl.
CPC ............ *G06F 21/562* (2013.01); *G06F 21/53* (2013.01); *G06F 21/567* (2013.01); *G06F 2221/033* (2013.01)

(58) Field of Classification Search
CPC .. G06F 21/56; G06F 21/562; G06F 2221/033; G06F 21/53; G06F 21/566; G06F 21/564; G06F 21/563; G06F 21/561
USPC ........................................................ 726/23
See application file for complete search history.

(56) References Cited

U.S. PATENT DOCUMENTS

| | | | | |
|---|---|---|---|---|
| 2003/0120947 A1* | 6/2003 | Moore | ................... | G06F 21/563 726/22 |
| 2004/0054917 A1* | 3/2004 | Obrecht | ................ | G06F 21/566 726/22 |
| 2008/0016339 A1 | 1/2008 | Shukla | | |
| 2008/0263669 A1* | 10/2008 | Alme | ..................... | G06F 21/56 726/24 |
| 2013/0305368 A1* | 11/2013 | Ford | ..................... | G06F 21/568 726/23 |
| 2013/0326625 A1 | 12/2013 | Anderson et al. | | |
| 2015/0088967 A1 | 3/2015 | Muttik | | |

OTHER PUBLICATIONS

Ye, Yanfang, et al. "Combining file content and file relations for cloud based malware detection." Proceedings of the 17th ACM SIGKDD international conference on Knowledge discovery and data mining. ACM, 2011.*

* cited by examiner

*Primary Examiner* — Syed Zaidi
(74) *Attorney, Agent, or Firm* — Harrity & Harrity, LLP

(57) ABSTRACT

A device may analyze a first file for malware. The device may determine that the first file causes a second file to be downloaded. The device may store linkage information that identifies a relationship between the first file and the second file based on determining that the first file causes the second file to be downloaded. The device may analyze the second file for malware. The device may determine a first malware score for the first file based on analyzing the second file for malware and based on the linkage information. The device may determine a second malware score for the second file based on analyzing the first file for malware and based on the linkage information.

20 Claims, 9 Drawing Sheets

100

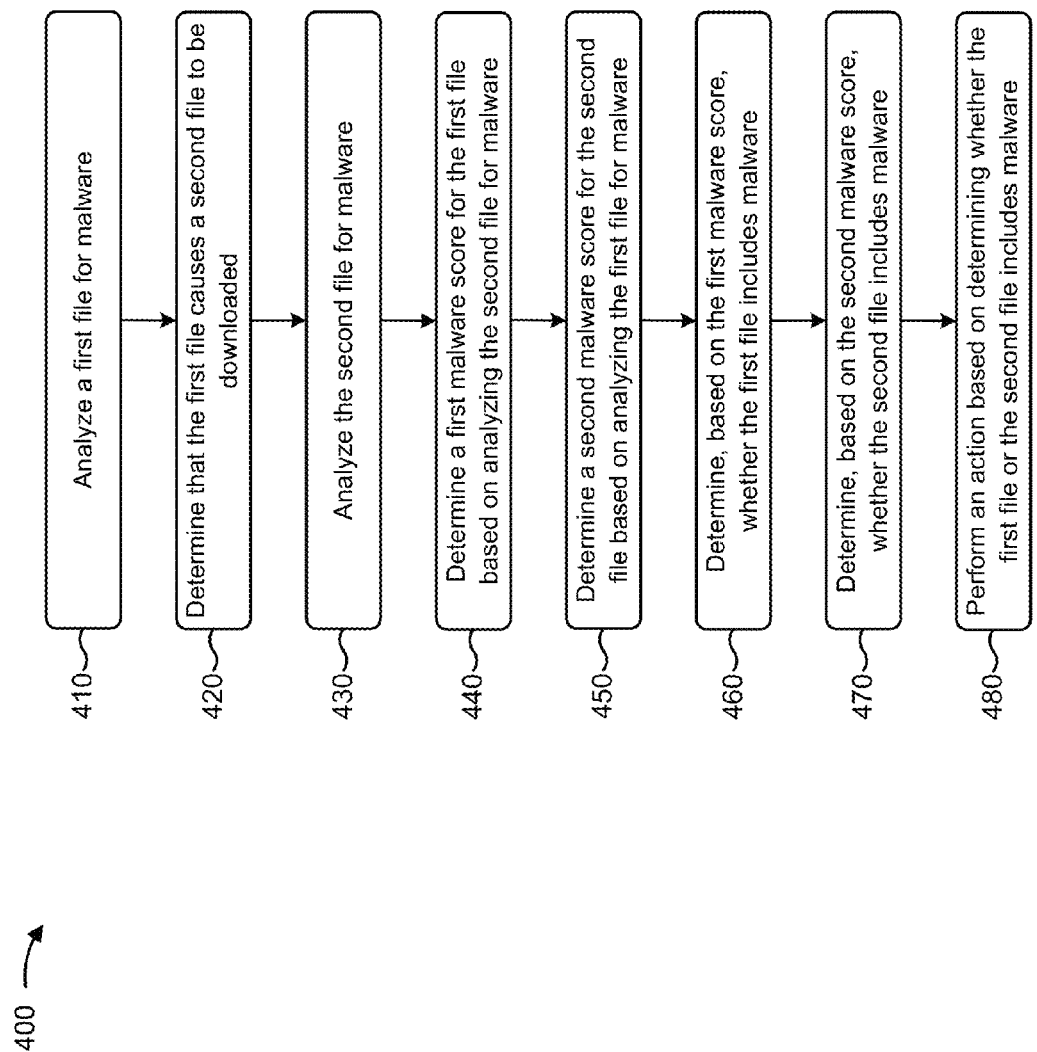

IDENTIFYING MALWARE BASED ON A RELATIONSHIP BETWEEN A DOWNLOADER FILE AND A DOWNLOADED FILE

BACKGROUND

Malicious software ("malware") may refer to any software used to disrupt computer operations, gather sensitive information, gain access to private computer systems, or the like. Malware may refer to a variety of types of hostile or intrusive software, including a computer virus, a worm, a trojan horse, ransomware, spyware, adware, scareware, or other malicious software.

A sandbox environment may refer to a computing environment that may be used to test for malware. For example, a sandbox environment may be used to execute untested code, untrusted software (e.g., from unverified third parties), or the like. A sandbox environment may provide a tightly controlled set of resources for executing a software program without permitting the software program to harm a device that hosts the sandbox environment. For example, the sandbox environment may restrict access provided to the software program (e.g., may restrict network access, access to inspect a host system, read and/or write access, etc.) to prevent harm to the host device.

SUMMARY

According to some possible implementations, a computer-readable medium may store one or more instructions that, when executed by one or more processors, cause the one or more processors to execute a first file and determine, based on executing the first file, that the first file causes a second file to be downloaded. The second file may be different from the first file. The one or more instructions may cause the one or more processors to store linkage information that identifies a relationship between the first file and the second file based on determining that the first file causes the second file to be downloaded. The one or more instructions may cause the one or more processors to analyze the second file for malware, and to determine a malware score for the first file based on analyzing the second file for malware and based on the linkage information.

According to some possible implementations, a device may analyze a first file for malware, and may determine that the first file causes a second file to be downloaded. The second file may be different from the first file. The device may store linkage information that identifies a relationship between the first file and the second file based on determining that the first file causes the second file to be downloaded. The device may determine a malware score for the second file based on analyzing the first file for malware and based on the linkage information.

According to some possible implementations, a method may include analyzing, by a device, a first file for malware. The method may include determining, by the device, that the first file causes a second file to be downloaded. The second file may be different from the first file. The method may include storing, by the device, linkage information that identifies a relationship between the first file and the second file based on determining that the first file causes the second file to be downloaded. The method may include analyzing, by the device, the second file for malware. The method may include determining, by the device, a first malware score for the first file based on analyzing the second file for malware and based on the linkage information. The method may include determining, by the device, a second malware score for the second file based on analyzing the first file for malware and based on the linkage information.

BRIEF DESCRIPTION OF THE DRAWINGS

FIG. 4 is a flow chart of an example process for identifying malware based on a relationship between a downloader file and a downloaded file;

DETAILED DESCRIPTION

The following detailed description of example implementations refers to the accompanying drawings. The same reference numbers in different drawings may identify the same or similar elements.

A security device (e.g., a firewall, a server, etc.) may use a sandbox environment to test a file for malware, such as by executing the file in the sandbox environment and monitoring for an indication that the file is malware. If the security device determines that the file is malware, then the security device may perform an action to counteract the malware, such as blocking the file, preventing the file from being sent to a client device, sending a message to alert a system administrator that the file is malware, or the like. However, detection of malware may be complicated when a first file, that is not identified as malware, downloads a second file that is malware. In this case, the security device may fail to identify the first file as malware, which may lead to future malware infections after the first file downloads the second file.

As another example, the first file (e.g., a downloader file) may cause different versions of the second file (e.g., a downloaded file) to be downloaded, which may also complicate malware detection. For example, some of the versions the second file may be newly released malware that has not yet been identified as malware. In this case, the security device may fail to identify the second file as malware, which may lead to a malware infection. Implementations described herein assist in identifying malware based on a relationship between a downloader file and a downloaded file, thereby increasing the effectiveness of malware testing and improving computer security.

Figure 1:
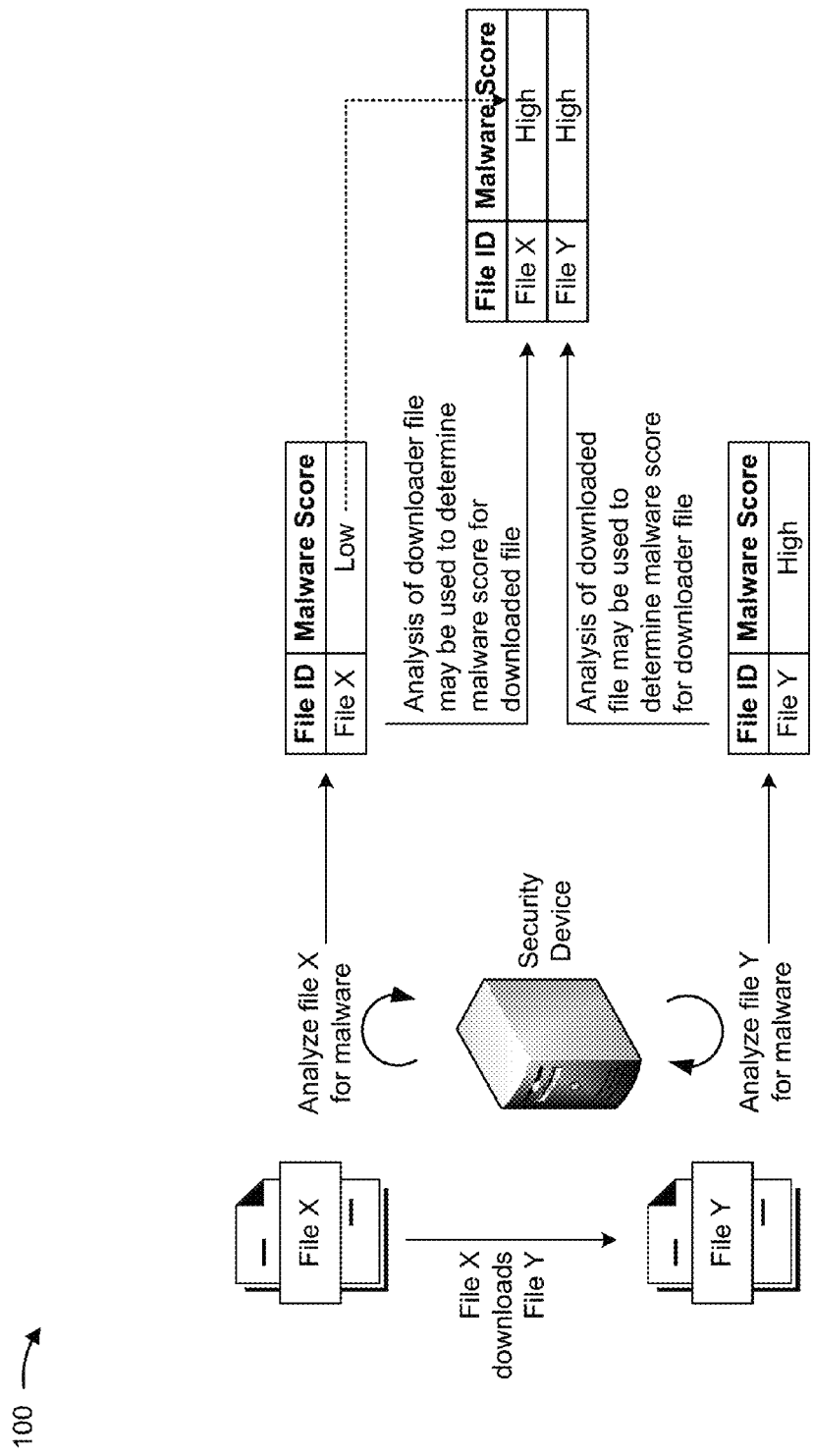
FIG. 1 is a diagram of an overview of an example implementation described herein.

FIG. 1 is a diagram of an overview of an example implementation 100 described herein. As shown in FIG. 1, a security device may receive a file, shown as File X, for malware analysis. File X may be a downloader file that downloads another file, shown as File Y. The security device may analyze File X for malware, and/or may analyze File Y for malware. For example, the security device may execute File X and/or File Y in a sandbox environment, and may monitor the sandbox environment for an indication of whether File X and/or File Y includes malware. As shown, the security device may generate malware scores for File X and File Y based on the analysis. For example, the security device may assign a low malware score to File X (e.g., the downloader file), which may indicate that File X is less likely to be malware. As further shown, the security device may assign a high malware score to File Y (e.g., the downloaded file), which may indicate that File Y is more likely to be malware.

The security device may identify a relationship between File X and File Y (e.g., may determine that File X caused File Y to be downloaded), and may use the relationship to determine and/or modify malware scores for File X and/or File Y. In example implementation 100, File X, associated with a low malware score, caused the security device to download File Y, associated with a high malware score. Because File X downloaded a file with a high likelihood of being malware, File X has a high likelihood of being malware. Thus, as shown, the security device may assign a high malware score to File X, which was previously assigned a low malware score (e.g., after an initial analysis that did not take into account the downloading of File Y by File X).

In this way, the security device may increase the accuracy of malware detection. Furthermore, the security device may assist in identifying malware that would otherwise not be identified, thereby improving the effectiveness of malware detection. As indicated above, FIG. 1 is provided as an example. Additional examples and techniques are described in more detail elsewhere herein.

Figure 2:
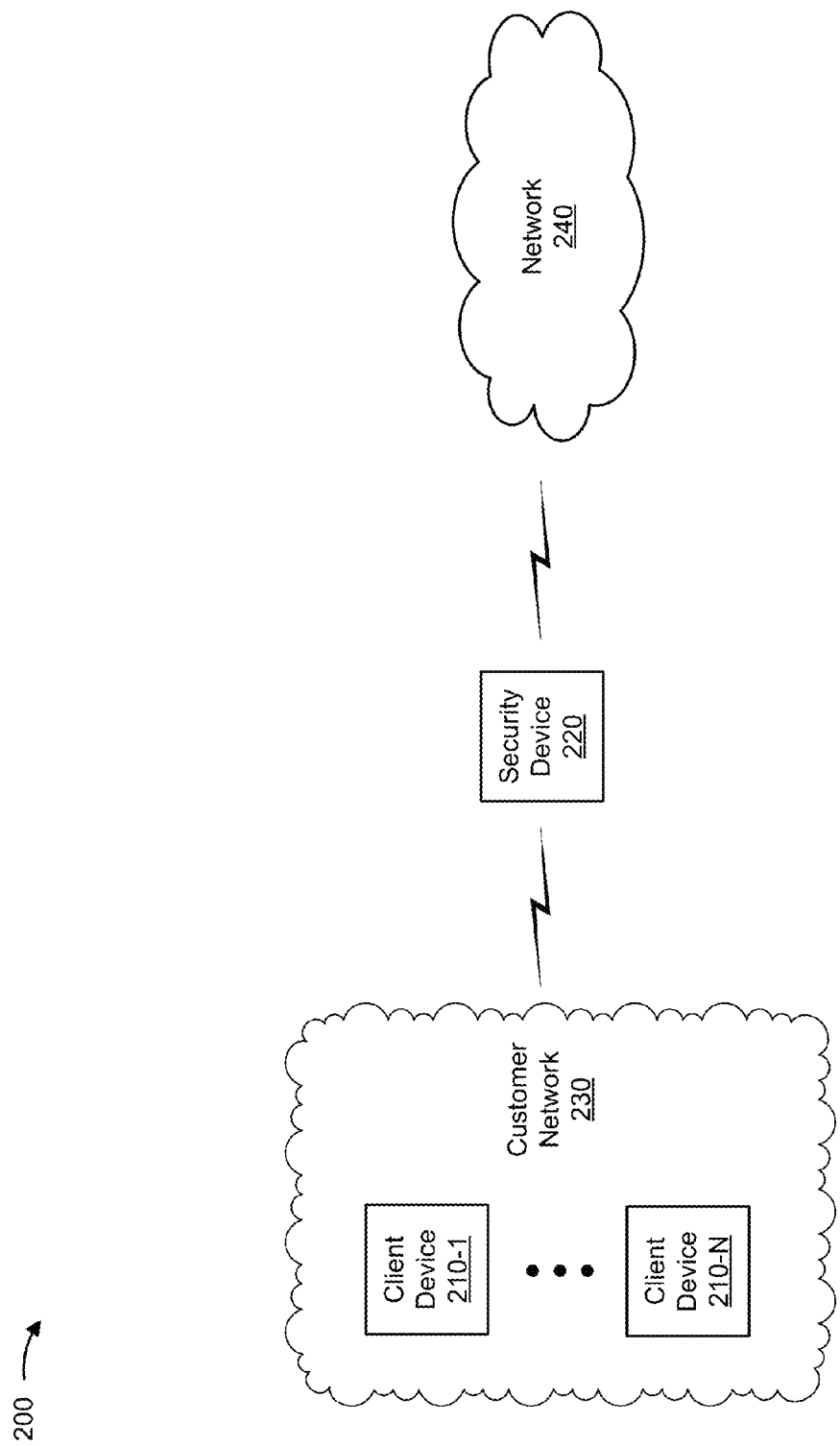
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a security device 220, a customer network, and a network 240. Devices of environment 200 may interconnect via wired connections, wireless connections, or a combination of wired and wireless connections.

Client device 210 may include one or more devices capable of executing and/or analyzing files (e.g., computer files). For example, client device 210 may include a desktop computer, a laptop computer, a tablet computer, a mobile phone (e.g., a smart phone, a radiotelephone, etc.), a server, or a similar type of device. In some implementations, client device 210 may be capable of executing and/or analyzing a file that includes malware, which may cause harm to client device 210, information stored by client device 210, a user of client device 210, and/or another client device 210. In some implementations, client device 210 may reside on customer network 230. In some implementations, client device 210 may execute a sandbox environment for a malware analysis on client device 210 (e.g., instead of or in addition to security device 220 executing a sandbox environment for malware analysis on security device 220). For example, client device 210 may use a relationship between a downloader file and a downloaded file to perform a malware analysis, as described in more detail elsewhere herein.

Security device 220 may include one or more devices capable of processing and/or transferring network traffic associated with client device 210, and/or capable of providing a security service (e.g., a malware detection service) for client device 210 and/or customer network 230. For example, security device 220 may include a gateway, a firewall, a router, a bridge, a hub, a switch, a load balancer, an access point, a reverse proxy, a server (e.g., a proxy server), or a similar type of device. Security device 220 may be used in connection with a single client device 210 or a group of client devices 210 (e.g., client devices 210 associated with a private network, a data center, etc.). In some implementations, communications may be routed through security device 220 to reach the group of client devices 210. For example, security device 220 may be positioned within a network as a gateway to customer network 230 that includes the group of client devices 210. Additionally, or alternatively, communications from client devices 210 may be encoded such that the communications are routed to security device 220 before being routed elsewhere.

In some implementations, security device 220 may execute a sandbox environment for a malware analysis on security device 220. For example, security device 220 may use a relationship between a downloader file and a downloaded file to perform a malware analysis, as described in more detail elsewhere herein. In some implementations, security device 220 may execute multiple sandbox environments, for parallel processing of files, when performing a malware analysis. For example, security device 220 may load and/or host multiple virtual machines corresponding to the multiple sandbox environments. Additionally, or alternatively, environment 200 may include multiple security devices 220 that each executes a sandbox environment for parallel processing of files during a malware analysis.

Customer network 230 may include one or more wired and/or wireless networks. For example, customer network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, or the like, and/or a combination of these or other types of networks. In some implementations, customer network 230 may be a private network associated with client devices 210.

Network 240 may include one or more wired and/or wireless networks. For example, network 240 may include a cellular network, a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks. In some implementations, security device 220 may perform a malware analysis to analyze one or more files requested by one or more client devices 210 from one or more devices (e.g., one or more servers) associated with network 240. Additionally, or alternatively, the file(s) may be pushed to one or more client devices 210 (e.g., from one or more devices associated with network 240), and security device 220 may perform a malware analysis to analyze the file(s).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
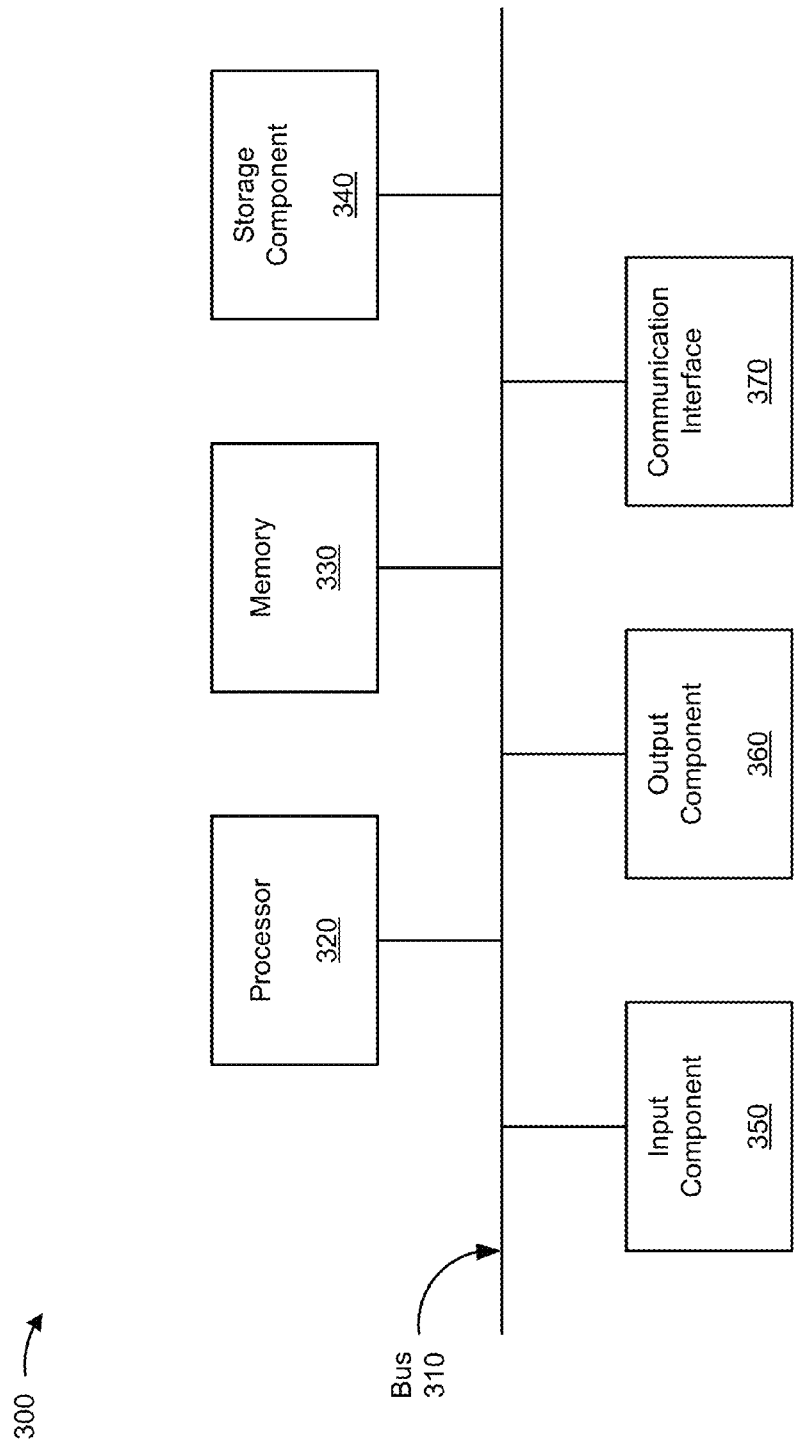
FIG. 3 is a diagram of example components of one or more devices of FIG. 2.

FIG. 3 is a diagram of example components of a device 300. Device 300 may correspond to client device 210 and/or security device 220. In some implementations, client device 210 and/or security device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for identifying malware based on a relationship between a downloader file and a downloaded file. In some implementations, one or more process blocks of FIG. 4 may be performed by security device 220. In some implementations, one or more process blocks of FIG. 4 may be performed by another device or a group of devices separate from or including security device 220, such as client device 210.

As shown in FIG. 4, process 400 may include analyzing a first file for malware (block 410). For example, security device 220 may receive a first file (e.g., an executable file, an application, a program, etc.) to be analyzed in a sandbox environment. The first file may be a downloader file that causes a second file (e.g., a downloaded file) to be downloaded. As used herein, a downloader file may refer to software that, when executed, causes other software to be downloaded. For example, when executed by security device 220, the first file may cause security device 220 to download the second file (e.g., sometimes referred to herein as the first file downloading the second file).

In some implementations, the first file may be associated with client device 210 (e.g., may be stored by client device 210, may be executing on client device 210, may be requested by client device 210, may be sent to client device 210, etc.). As an example, client device 210 may request the first file (e.g., from a website, via an email link, etc.), and security device 220 may receive and/or analyze the first file before the first file is provided to client device 210. As another example, the first file may be pushed to client device 210, and security device 220 may receive the first file (e.g., may intercept the first file before the first file is received by client device 210, may obtain the first file after the first file is received by client device 210, etc.).

Security device 220 may analyze the first file for malware. In some implementations, security device 220 may analyze the first file in a sandbox environment. The sandbox environment may include a computing environment for testing files for malware. For example, the sandbox environment may include a virtual computing environment executing on a virtual machine. In some implementations, security device 220 may analyze the first file by executing the first file in the sandbox environment, and by monitoring the first file and/or the sandbox environment for behavior indicative of malware. Additionally, or alternatively, security device 220 may analyze the first file by executing the first file without using a sandbox environment.

In some aspects, security device 220 may analyze the first file by, for example, performing an anti-virus analysis (e.g., scanning the file using anti-virus software, a suite of anti-virus software, etc.), performing a static analysis (e.g., without executing the file, such as by comparing the file to other analyzed files for similarity, polymorphism, etc.), performing a dynamic analysis (e.g., by executing the file), performing a sandbox analysis (e.g., by executing the file in a sandbox analysis), performing multiple sandbox analyses (e.g., by executing the file in different sandboxes with different configurations, such as different operating systems and/or versions of operating systems, different installed applications, different browsers, etc.), or the like.

As further shown in FIG. 4, process 400 may include determining that the first file causes a second file to be downloaded (block 420). For example, security device 220 may execute the first file in a sandbox environment, and may monitor the sandbox environment to determine whether the first file causes a second file (e.g., a downloaded file) to be downloaded. For example, security device 220 may monitor communications to and/or from security device 220 after executing the first file. Based on monitoring the communications, security device 220 may determine that the second file has been downloaded or is being downloaded, and that the download was caused by the first file because the first file has been executed or is being executed. Additionally, or alternatively, security device 220 may monitor a memory associated with security device 220 after executing the first file. Based on monitoring the memory, security device 220 may determine that the second file has been downloaded or is being downloaded, and that the download was caused by the first file because the first file has been executed or is being executed. Additionally, or alternatively, security device 220 may analyze instructions (e.g., program code) included in the first file. Based on analyzing the instructions, security device 220 may determine that the first file includes instructions that cause the second file to be downloaded.

In some implementations, security device 220 may store linkage information that indicates a relationship between the first file and the second file. For example, the linkage information may include a first file identifier that identifies the first file (e.g., a name of the first file, a memory location where the first file is stored, etc.), a second file identifier that identifies the second file (e.g., a name of the second file, a memory location where the second file is stored, etc.), and/or a relationship indicator that indicates a relationship between the first file and the second file. As an example, the relationship indicator may indicate that the first file caused the second file to be downloaded. Additionally, or alternatively, the linkage information may identify the first file as a downloader file, and/or may identify the second file as a downloaded file (e.g., that was downloaded by the downloader file). In some implementations, security device 220 may store the linkage information using a data structure. The linkage information may be used to identify malware based on a relationship between the first file and the second file, as described in more detail below.

In some implementations, the first file may cause a third file, a fourth file, etc. to be downloaded. For example, security device 220 may analyze and/or execute the first file multiple times, and each execution of the first file may cause one or more other files to be downloaded (e.g., downloaded files). Additionally, or alternatively, execution of the first file may cause more than one file to be downloaded (e.g., when the first file is analyzed over a long time period that triggers multiple downloads). As another example, execution of the first file may cause the second file to be downloaded, and execution of the second file may cause a third file, a fourth file, etc. to be downloaded. In these cases, security device 220 may store linkage information that indicates relationship(s) between two or more of the first file, the second file, the third file, the fourth file, etc., in a similar manner as described above with respect to storing linkage information associated with the first file and the second file. The linkage information may be used to identify malware based on a relationship between the first file, the second file, the third file, the fourth file, etc., as described in more detail below.

As further shown in FIG. 4, process 400 may include analyzing the second file for malware (block 430). For example, security device 220 may receive the second file (e.g., an executable file, an application, a program, etc.) based on execution of the first file. As described above, execution of the first file may cause security device 220 to download the second file. As an example, the first file may cause security device 220 to request the second file (e.g., from a website, via an email link, etc.), and security device 220 may receive and/or analyze the second file before or after the second file is provided to client device 210 (e.g., may intercept the second file before the second file is received by client device 210, may obtain the second file after the second file is received by client device 210, etc.).

Security device 220 may analyze the second file for malware in a similar manner as described above with respect to analyzing the first file for malware. In some implementations, security device 220 may analyze the second file in a sandbox environment. In some implementations, security device 220 may analyze the second file by executing the second file in the sandbox environment, and by monitoring the second file and/or the sandbox environment for behavior indicative of malware.

In some implementations, security device 220 may prevent a downloaded file from being analyzed for malware. For example, security device 220 may prevent a downloaded file from being analyzed when the downloaded file is the same as or similar to (e.g., shares a threshold degree of similarity with) another file that has already been analyzed. In this case, security device 220 may store linkage information that indicates a match or a similarity between the downloaded file and the file that has already been analyzed. Additionally, or alternatively, security device 220 may use a malware score for the file that has already been analyzed to determine a malware score for the downloaded file, as described in more detail below. In some implementations, security device 220 may apply a fuzzy matching algorithm to determine whether two files share a threshold degree of similarity.

As an example, assume that security device 220 executes a first file, which causes a second file to be downloaded. Further, assume that security device 220 analyzes the second file for malware. At a later time, assume that the first file causes a third file to be downloaded. Security device 220 may determine that the third file is the same as the second file, or that the third file shares a threshold degree of similarity with the second file (e.g., has the same or a similar file name, has the same or a similar file signature, has the same or a similar hash value, etc.). In this case, security device 220 may not analyze the third file for malware, thereby conserving computing resources. Additionally, or alternatively, security device 220 may assign the same malware score to the third file as the malware score assigned to the second file. In the event that the third file is different than the second file, security device 220 may analyze the third file for malware (e.g., and any other files that are subsequently downloaded based on executing and/or analyzing the first file or a subsequent file in the same manner).

In some aspects, security device 220 may analyze the second file by, for example, performing an anti-virus analysis (e.g., scanning the file using anti-virus software, a suite of anti-virus software, etc.), performing a static analysis (e.g., without executing the file, such as by comparing the file to other analyzed files for similarity, polymorphism, etc.), performing a dynamic analysis (e.g., by executing the file), performing a sandbox analysis (e.g., by executing the second file in the same sandbox environment as the first file, by executing the second file in a different sandbox environment as the first file, etc.), performing multiple sandbox analyses (e.g., by executing the file in different sandboxes with different configurations, such as different operating systems and/or versions of operating systems, different installed applications, different browsers, etc.), or the like. In some implementations, security device 220 may analyze the first file for malware in a sandbox environment, and may analyze the second file for malware independent of the sandbox environment (e.g., in a different sandbox environment, in a different sandbox analysis session, etc.). In this way, the second file may undergo an independent malware analysis (e.g., independent of the malware analysis performed on the first file).

As further shown in FIG. 4, process 400 may include determining a first malware score for the first file based on analyzing the second file for malware (block 440). For example, security device 220 may determine a first malware score for the first file. The first malware score may indicate a likelihood that the first file includes malware. The first malware score may include, for example, a binary indicator (e.g., "is malware" vs. "is not malware"), a numeric indicator (e.g., a likelihood that the file is malware as indicated by a range of numbers, such as from 1 to 10), a character string indicator (e.g., "high," "medium," "low," etc.), or the like. In some implementations, security device 220 may store the first malware score in association with a first file identifier that identifies the first file.

In some implementations, security device 220 may determine the first malware score based on analyzing the first file for malware. For example, security device 220 may execute the first file, may analyze the first file and/or a sandbox environment for behavior indicative of malware, and may generate the first malware score based on the analysis. Additionally, or alternatively, security device 220 may determine the first malware score based on analyzing the second file for malware. For example, security device 220 may execute the first file, which may cause the second file to be downloaded. Security device 220 may execute the second file, may analyze the second file and/or a sandbox environment for behavior indicative of malware, and may generate and/or modify the first malware score based on the analysis. In this way, if the first file does not exhibit behavior indicative of malware, but downloads a second file that exhibits behavior indicative of malware, security device 220 may use linkage information that indicates a relationship between the first file and the second file to generate and/or modify a malware score for the first file based on the behavior of the second file.

In some implementations, security device 220 may generate a malware base score for the first file (e.g., a first malware base score) based on analyzing the first file for malware. The malware base score may indicate a likelihood that the first file includes malware based on an independent analysis of the first file (e.g., an analysis that is independent of analyzing the second file downloaded by the first file). Additionally, or alternatively, security device 220 may generate a malware feedback score for the first file (e.g., a first malware feedback score) based on analyzing the second file for malware. The malware feedback score may indicate a likelihood that the first file includes malware based on an analysis of the second file that was downloaded by the first file.

In some implementations, security device 220 may generate the first malware score for the first file based on the malware base score and the malware feedback score. For example, security device 220 may combine the malware base score and the malware feedback score to generate the first malware score (e.g., using a mathematical combination such as addition, subtraction, multiplication, division, averaging, weighted averaging, a weighted combination, etc.).

In this way, security device 220 may use a malware analysis of a second file, downloaded by a first file, to determine a likelihood that the first file includes malware. For example, if a malware analysis of the second file indicates a high likelihood that the second file includes malware, then security device 220 may generate and/or modify a malware score associated with the first file to indicate that the first file has a high likelihood of including malware (or a higher likelihood than indicated by a previously-determined malware base score). As another example, if a malware analysis of the second file indicates a low likelihood that the second file includes malware, then security device 220 may generate and/or modify a malware score associated with the first file to indicate that the first file has a low likelihood of including malware (or a lower likelihood than indicated by a previously-determined malware base score). In this way, security device 220 may improve the accuracy of a malware analysis, thereby improving security. In some cases, if more than one file is downloaded, security device 220 may perform this analysis for all of the downloaded files. For example, security device 220 may use an analysis of a second, third, fourth, fifth, etc. downloaded file to determine the malware score of a first file.

As further shown in FIG. 4, process 400 may include determining a second malware score for the second file based on analyzing the first file for malware (block 450). For example, security device 220 may determine a second malware score for the second file. The second malware score may indicate a likelihood that the second file includes malware. The second malware score may include, for example, a binary indicator (e.g., "is malware" vs. "is not malware"), a numeric indicator (e.g., a likelihood that the file is malware as indicated by a range of numbers, such as from 1 to 10), a character string indicator (e.g., "high," "medium," "low," etc.), or the like. In some implementations, security device 220 may store the second malware score in association with a second file identifier that identifies the second file.

In some implementations, security device 220 may determine the second malware score based on analyzing the second file for malware. For example, security device 220 may execute the second file, may analyze the second file and/or a sandbox environment for behavior indicative of malware, and may generate the second malware score based on the analysis. Additionally, or alternatively, security device 220 may determine the second malware score based on analyzing the first file for malware. For example, security device 220 may execute the first file, which may cause the second file to be downloaded. In some cases, security device 220 may execute the first file, may analyze the first file and/or a sandbox environment for behavior indicative of malware, and may generate and/or modify the second malware score based on the analysis. In this way, if the second file does not exhibit behavior indicative of malware, but a first file, that causes the second file to be downloaded, exhibits behavior indicative of malware, security device 220 may use linkage information that indicates a relationship between the first file and the second file to generate and/or modify a malware score for the second file based on the behavior of the first file.

In some implementations, security device 220 may generate a malware base score for the second file (e.g., a second malware base score) based on analyzing the second file for malware. The malware base score may indicate a likelihood that the second file includes malware based on an independent analysis of the second file (e.g., an analysis that is independent of analyzing the first file that downloaded the second file). Additionally, or alternatively, security device 220 may generate a malware feedback score for the second file (e.g., a second malware feedback score) based on analyzing the first file for malware. The malware feedback score may indicate a likelihood that the second file includes malware based on an analysis of the first file that caused the second file to be downloaded.

As described above in connection with the first malware score, security device 220 may generate the second malware score for the second file based on the malware base score and the malware feedback score (e.g., based on a combination of the malware base score and the malware feedback score for the second file).

In this way, security device 220 may use a malware analysis of a first file, that downloads a second file, to determine a likelihood that the second file includes malware. For example, if a malware analysis of the first file indicates a high likelihood that the first file includes malware, then security device 220 may generate and/or modify a malware score associated with the second file to indicate that the second file has a high likelihood of including malware (or a higher likelihood than indicated by a previously-determined malware base score). As another example, if a malware analysis of the first file indicates a low likelihood that the second file includes malware, then security device 220 may generate and/or modify a malware score associated with the second file to indicate that the second file has a low likelihood of including malware (or a lower likelihood than indicated by a previously-determined malware base score). In this way, security device 220 may improve the accuracy of a malware analysis, thereby improving security.

Furthermore, by using a malware analysis of a first file, that downloads a second file, to determine a likelihood that the second file includes malware, security device 220 may add information to a data structure to aid in future malware analyses. For example, assume that security device 220 identifies a second file as malware because the file was downloaded by a first file that is malware. At a later time, security device 220 (or another device) may obtain the second file without having downloaded the second file based on executing the first file. Because the second file was previously identified as malware due to a relationship between the second file and the first file, security device 220 may use this information to determine that the second file is malware even when the second file is not downloaded using the first file. In this case, if security device 220 had not previously identified the second file as malware due to the second file being downloaded by a first file that is malware, security device 220 would have less information about the second file, which may result in a less accurate analysis of the second file.

In some implementations, security device 220 may use a malware score for a downloaded file that has already been analyzed to determine a malware score for another downloaded file. For example, assume that security device 220 executes a first file, which causes a second file to be downloaded. Further, assume that security device 220 analyzes the second file for malware, and determines a malware score for the second file. At a later time, assume that the first file causes a third file to be downloaded. Security device 220 may determine that the third file is the same as the second file, or that the third file shares a threshold degree of similarity with the second file (e.g., has the same or a similar file name, has the same or a similar file signature, has the same or a similar hash value, etc.). In this case, security device 220 may determine a third malware score for the third file based on a second malware score for the second file (e.g., may use the same score, may assign a weight to the second malware score to generate the third malware score, etc.). In this case, security device 220 may not analyze the third file for malware, thereby conserving computing resource.

Additionally, or alternatively, security device 220 may assign a malware score to the third file based on a malware score assigned to the second file (e.g., may assign the same malware score). When two or more files share a threshold degree of similarity, this may be an indicator of malware because malicious users may attempt to avoid detection by modifying the files to differ slightly from one another (e.g., the files may be polymorphic). Thus, in some implementations, security device 220 may generate and/or modify malware score(s) for the second file and/or the third file to indicate that the second file and/or the third file are more likely to be malware when the second file and the third file share a threshold degree of similarity (e.g., are polymorphic).

In some cases, security device 220 may analyze a file for malware multiples times, or may use multiple factors to analyze a file for malware. This may result in a feedback loop where, for example, security device 220 increases a first malware score for a first file based on a high second malware score for a second file. In turn, this may cause security device 220 to increase the second malware score for the second file because the first malware score for the first file has been increased. To avoid such a feedback loop, security device 220 may use a malware base score and a malware feedback score, as described above.

As another example, security device 220 may avoid a feedback loop by only permitting unidirectional feedback. For example, security device 220 may use an analysis of the second file to determine the first malware score (e.g., may use the analysis of the second file as feedback that contributes to the first malware score), and may not use an analysis of the first file to determine the second malware score. As another example, security device 220 may use an analysis of the first file to determine the second malware score (e.g., may use the analysis of the first file as feedback that contributes to the second malware score), and may not use an analysis of the second file to determine the first malware score. In this way, security device 220 may avoid creating a feedback loop of iterative increases or decreases to the first malware score and the second malware score.

As further shown in FIG. 4, process 400 may include determining, based on the first malware score, whether the first file includes malware (block 460), and determining, based on the second malware score, whether the second file includes malware (block 470). For example, security device 220 may use the first malware score to determine whether the first file includes malware, and may use the second malware score to determine whether the second file includes malware. For example, security device 220 may determine whether a malware score satisfies a threshold (e.g., has a particular value, is greater than or equal to a particular value, is less than or equal to a particular value, such as a string value, a numeric value, a binary value, etc.).

As further shown in FIG. 4, process 400 may include performing an action based on determining whether the first file or the second file includes malware (block 480). For example, security device 220 may perform a first action when a file includes malware, and may perform a second action (e.g., a different action) when the file does not include malware.

In some implementations, when security device 220 determines that a file includes malware, security device 220 may perform an action to counteract the malware. In some implementations, security device 220 may counteract the malware by identifying the file as suspicious. In this case, security device 220 may store a malware indicator, in association with the file, that indicates that the file is suspicious (e.g., is malware). In this way, security device 220 and/or another device may use the malware indicator to identify the file as malware, and may perform an action to counteract the malware.

Additionally, or alternatively, security device 220 may counteract the malware by identifying the file (e.g., in memory) and deleting the file from memory. In this way, security device 220 may prevent the file from harming security device 220 and/or client device 210.

As another example, assume that client device 210 requests the file from a device associated with network 240 (e.g., a web server, a host server, etc.). In this case, security device 220 may receive the request, may request the file from the device, may receive the file from the device, and may analyze the file for malware before sending the file to client device 210. Additionally, or alternatively, assume that a device, associated with network 240, pushes a file to client device 210. In this case, security device 220 may receive the file, and may analyze the file for malware before sending the file to client device 210. If security device 220 determines that the file includes malware, then security device 220 may perform the action to counteract the malware by preventing the file from being provided to client device 210. In this way, security device 220 may protect client devices 210, of customer network 230, from security threats.

In some implementations, if security device 220 determines that the file includes malware, then security device 220 may counteract the malware by monitoring the file (e.g., by monitoring communications sent by the file) to identify a device with which the file communicates (e.g., to identify a command and control server). In this case, security device 220 may block communications associated with the device, may provide an instruction to client device 210 and/or another device associated with customer network 230 (e.g., a firewall, a router, a gateway, etc.) to block communications associated with the device (e.g., to block communications to and/or from the device), or the like. In this way, security device 220 may prevent a malicious file from harming client device 210.

Additionally, or alternatively, security device 220 may provide a notification that identifies client devices 210 that are communicating with the device (e.g., the command and control server) to identify and protect these client devices 210. In this way, security device 220 may protect client devices 210, of customer network 230, from security threats.

In some implementations, when security device 220 determines that a file does not include malware, security device 220 may perform an action to permit the file to be accessed. In some implementations, security device 220 may permit the file to be accessed by identifying the file as unsuspicious. In this case, security device 220 may store a malware indicator, in association with the file, that indicates that the file is unsuspicious (e.g., is not malware).

As another example, assume that client device 210 requests the file from a device associated with network 240 (e.g., a web server, a host server, etc.). In this case, security device 220 may receive the request, may request the file from the device, may receive the file from the device, and may analyze the file for malware before sending the file to client device 210. Additionally, or alternatively, assume that a device, associated with network 240, pushes a file to client device 210. In this case, security device 220 may receive the file, and may analyze the file for malware before sending the file to client device 210. If security device 220 determines that the file does not include malware, then security device 220 may permit the file to be accessed by providing the file to client device 210. In this way, security device 220 may protect client devices 210, of customer network 230, from security threats.

By using a malware analysis of a first file, that downloads a second file, to determine whether the second file includes malware, and/or by using a malware analysis of the second file to determine whether the first file includes malware, security device 220 may improve an effectiveness of malware analysis and may more accurately determine whether a file includes malware.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
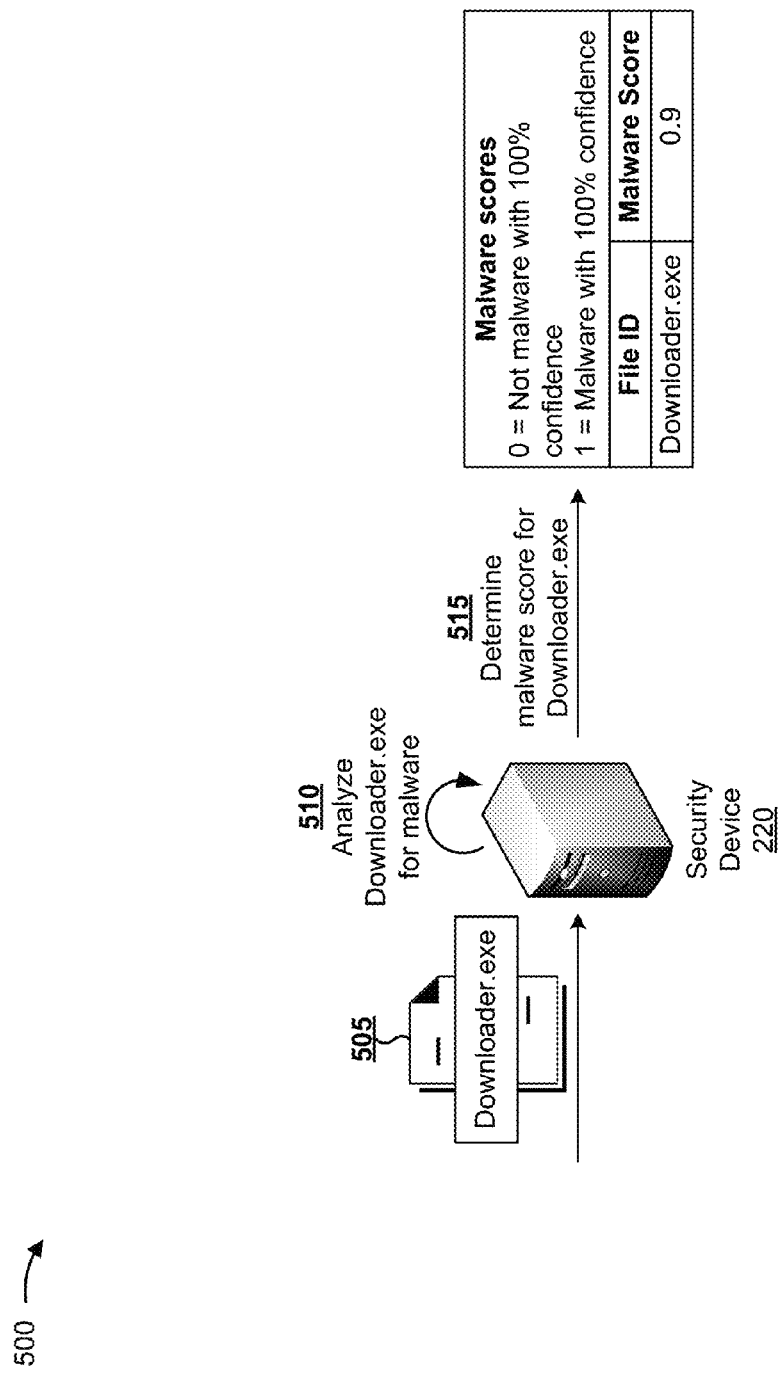
FIGS. 5A-5C are diagrams of an example implementation relating to the example process shown in FIG. 4.
Figure 5B:
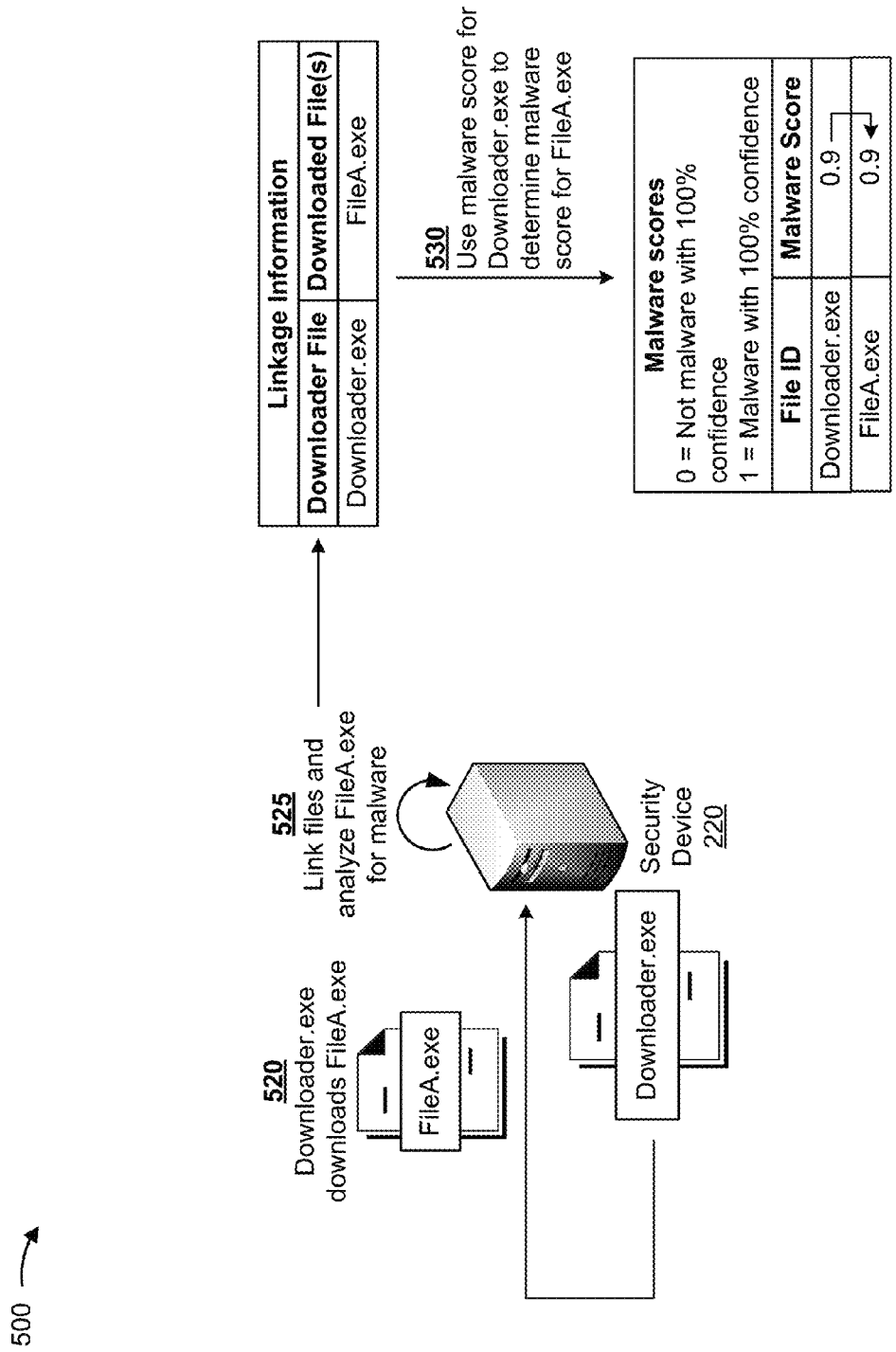
Figure 5C:
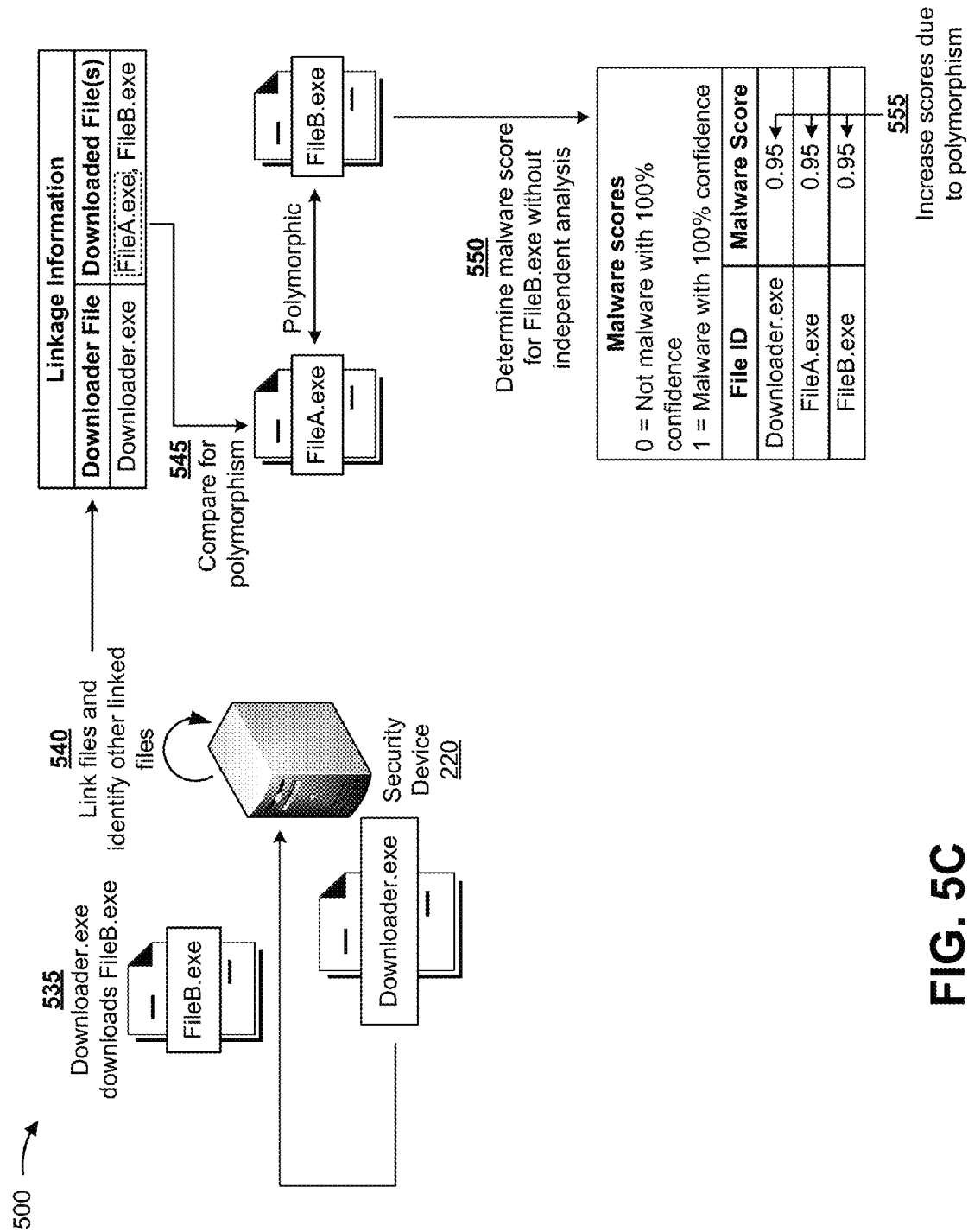

FIGS. 5A-5C are diagrams of an example implementation 500 relating to example process 400 shown in FIG. 4. FIGS. 5A-5C show an example of identifying malware based on a relationship between a downloader file and a downloaded file.

As shown in FIG. 5A, and by reference number 505, security device 220 receives a first file, shown as Downloader.exe. Assume that the first file causes a second file to be downloaded, as described in more detail below. As shown by reference number 510, security device 220 analyzes Downloader.exe for malware, such as be executing Downloader.exe in a sandbox environment and monitoring the sandbox environment for behavior indicative of malware. As shown by reference number 515, security device 220 determines a malware score for Downloader.exe based on the analysis. As shown, assume that malware scores range from zero to one, where a malware score of zero indicates that a file is not malware with 100% confidence, and where a malware score of one indicates that the file is malware with 100% confidence. As shown, security device 220 generates a malware score of 0.9 for Downloader.exe, which indicates that Downloader.exe is malware with 90% confidence.

As shown in FIG. 5B, and by reference number 520, assume that Downloader.exe causes a second file to be downloaded, shown as FileA.exe. As shown by reference number 525, security device 220 detects the download of FileA.exe, links Downloader.exe and FileA.exe, and analyzes FileA.exe for malware. As shown, security device 220 stores linkage information that indicates that Downloader.exe downloaded FileA.exe. As shown by reference number 530, security device 220 uses this linkage information and a malware score for Downloader.exe to determine a malware score for FileA.exe. As shown, assume that security device 220 assigns the same malware score, to FileA.exe, as the malware score assigned to Downloader.exe (e.g., in this case, 0.9).

As shown in FIG. 5C, and by reference number 535, assume that Downloader.exe causes a third file to be downloaded, shown as FileB.exe. As shown by reference number 540, security device 220 detects the download of FileB.exe, links Downloader.exe and FileB.exe, and determines whether there are any other files linked to Downloader.exe. In this case, security device 220 determines that FileA.exe is linked to Downloader.exe because FileA.exe was previously downloaded by Downloader.exe.

As shown by reference number 545, based on this determination, security device 220 compares FileA.exe and FileB.exe for polymorphism (e.g., a degree of similarity). Assume that security device 220 determines that FileA.exe and FileB.exe are polymorphic. As shown by reference number 550, because FileA.exe and FileB.exe are polymorphic, security device 220 determines a malware score for FileB.exe based on a malware score for FileA.exe, without performing an independent malware analysis of FileB.exe. For example, assume that security device 220 assigns a malware score of 0.9 to FileB.exe based on a malware score of 0.9 for FileA.exe. However, as shown by reference number 555, security device 220 may increase the malware score for FileA.exe and FileB.exe to 0.95 because these files are polymorphic, which may be an indicator of malware. Further, since the malware scores of FileA.exe and FileB.exe have increased due to polymorphism, security device 220 increases a malware score for Downloader.exe to 0.95 because Downloader.exe is linked to FileA.exe and FileB.exe. In this way, security device 220 may use a relationship between a downloader file and a downloaded file to improve an accuracy of a malware score, thereby improving security.

As indicated above, FIGS. 5A-5C are provided merely as an example. Other examples are possible and may differ from what was described with regard to FIGS. 5A-5C.

Figure 6A:
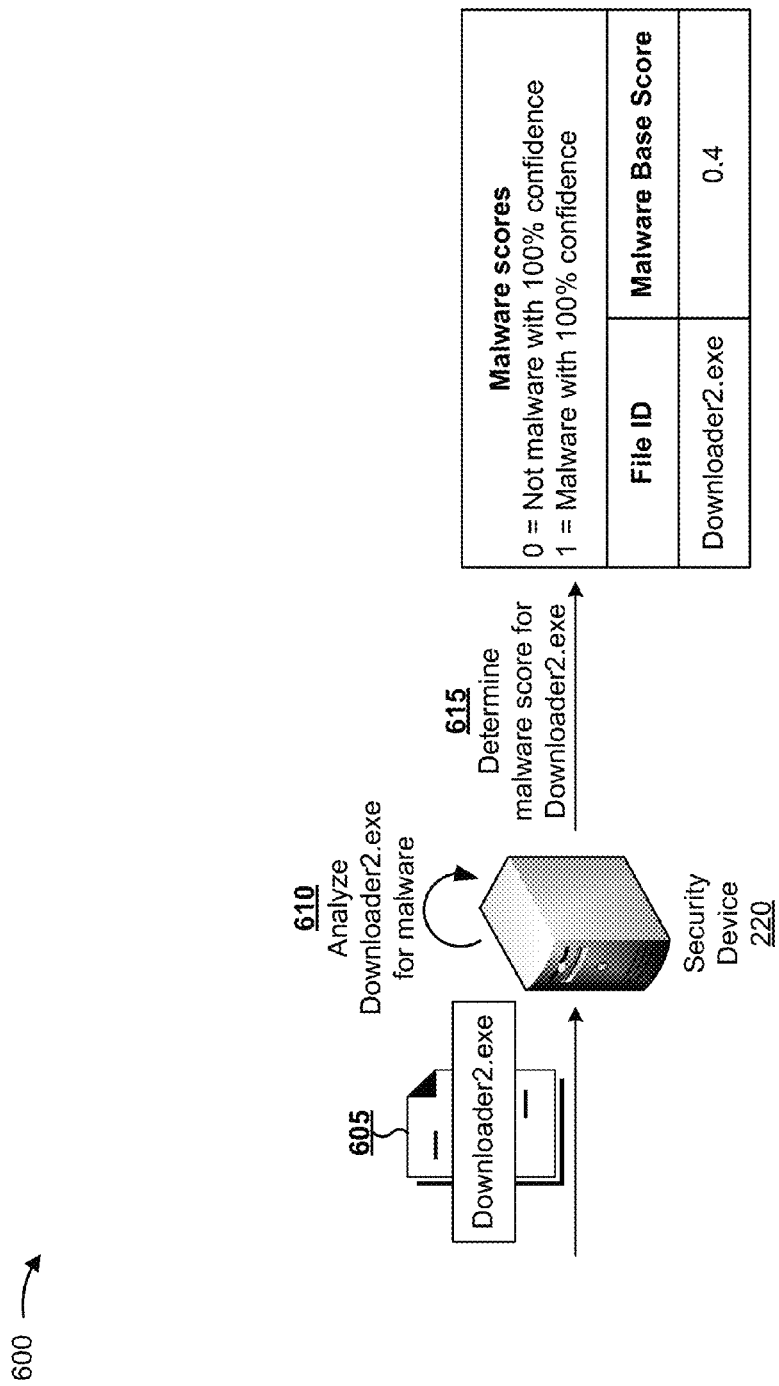
FIGS. 6A and 6B are diagrams of an example implementation relating to the example process shown in FIG. 4.
Figure 6B:
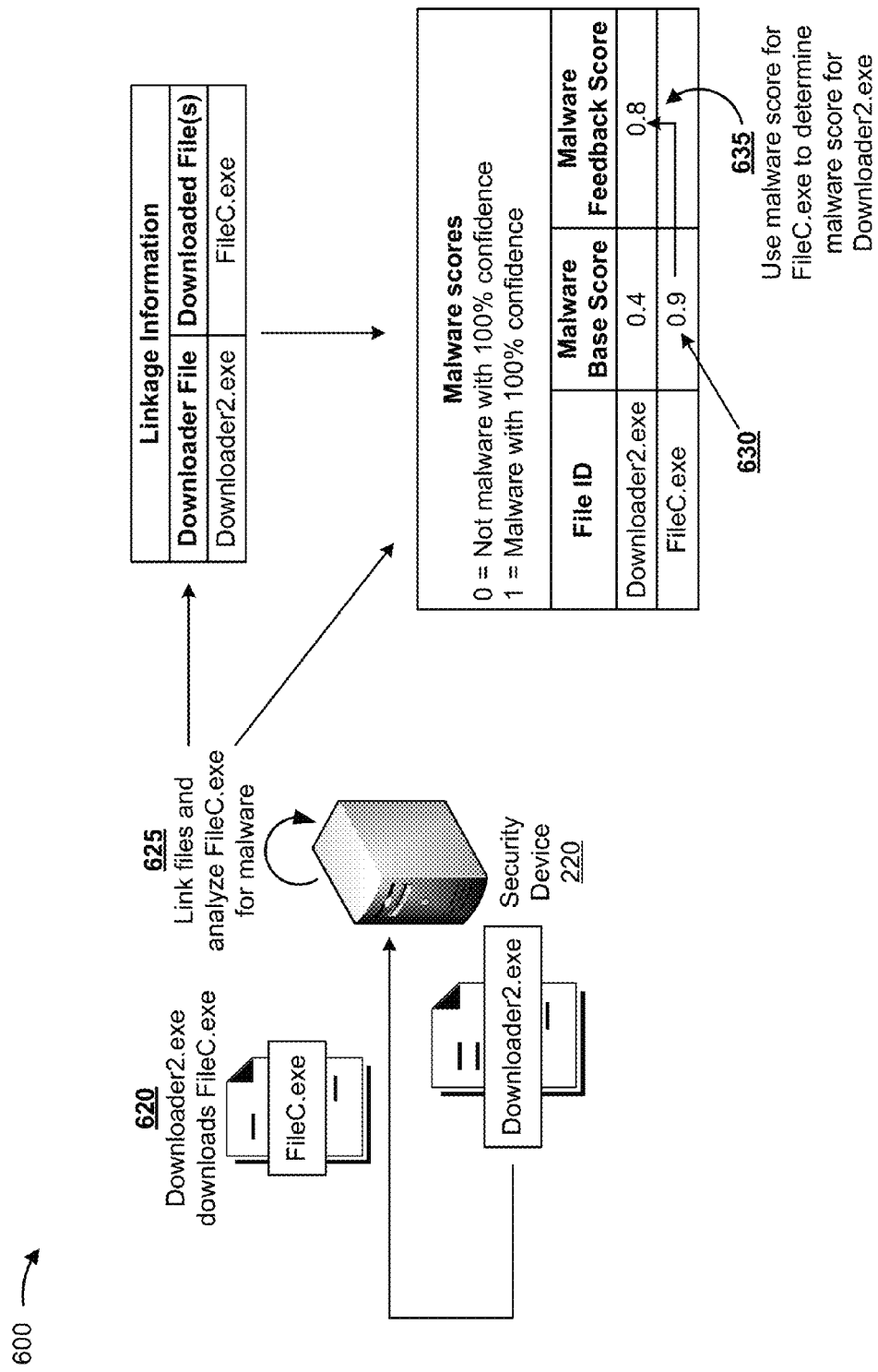

FIGS. 6A and 6B are diagrams of an example implementation 600 relating to example process 400 shown in FIG. 4. FIGS. 6A and 6B show an example of identifying malware based on a relationship between a downloader file and a downloaded file.

As shown in FIG. 6A, and by reference number 605, security device 220 receives a first file, shown as Downloader2.exe. Assume that the first file causes a second file to be downloaded, as described in more detail below. As shown by reference number 610, security device 220 analyzes Downloader2.exe for malware, such as be executing Downloader2.exe in a sandbox environment and monitoring the sandbox environment for behavior indicative of malware. As shown by reference number 615, security device 220 determines a malware score for Downloader2.exe based on the analysis. As shown, assume that malware scores range from zero to one, where a malware score of zero indicates that a file is not malware with 100% confidence, and where a malware score of one indicates that the file is malware with 100% confidence. Further, assume that the malware score is based on a combination of a malware base score and a malware feedback score. As shown, security device 220 generates a malware base score of 0.4 for Downloader2.exe, which indicates that Downloader2.exe is malware with 40% confidence (e.g., that Downloader2.exe is not malware with 60% confidence).

As shown in FIG. 6B, and by reference number 620, assume that Downloader2.exe causes a second file to be downloaded, shown as FileC.exe. As shown by reference number 625, security device 220 detects the download of FileC.exe, links Downloader2.exe and FileC.exe, and analyzes FileC.exe for malware. As shown, security device 220 stores linkage information that indicates that Downloader2.exe downloaded FileC.exe. As shown, security device 220 uses this linkage information and a malware score for FileC.exe to determine a malware score for Downloader2.exe. As shown by reference number 630, assume that an independent analysis of FileC.exe results in a malware base score of 0.9 for FileC.exe. As shown by reference number 635, security device 220 uses the malware base score for FileC.exe to generate a malware feedback score of 0.8 for Downloader2.exe. In this case, assume that the malware feedback score for Downloader2.exe is based on the malware base score for Downloader2.exe and the malware base score of FileC.exe. For example, security device 220 may use an average, a weighted average, a maximum, a minimum, or the like, of the malware base score for Downloader2.exe and the malware base score of FileC.exe to generate the malware feedback score for Downloader2.exe. In this way, security device 220 may use a relationship between a downloader file and a downloaded file to improve an accuracy of a malware score, thereby improving security.

As indicated above, FIGS. 6A and 6B are provided merely as an example. Other examples are possible and may differ from what was described with regard to FIGS. 6A and 6B.

Implementations described herein assist in identifying malware based on a relationship between a downloader file and a downloaded file, thereby increasing the effectiveness of malware testing and improving computer security.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A non-transitory computer-readable medium storing instructions, the instructions comprising:
one or more instructions that, when executed by one or more processors, cause the one or more processors to:
analyze a first file for malware;
determine that the first file causes a second file to be downloaded,
the second file being different from the first file;
store linkage information that identifies a relationship between the first file and the second file based on determining that the first file causes the second file to be downloaded;
analyze the second file for malware;
determine a malware base score based on analyzing the first file for malware;
determine a malware feedback score based on analyzing the second file for malware and based on the linkage information;
determine a first malware score for the first file based on the malware base score and malware feedback score; and
determine a second malware score for the second file based on analyzing the first file for malware and based on the linkage information.

2. The non-transitory computer-readable medium of claim 1, where the one or more instructions, when executed by the one or more processors, further cause the one or more processors to:
determine, based on the first malware score, whether the first file includes malware; and
selectively perform a first action or a second action based on determining whether the first file includes malware,
the first action including counteracting the first file based on determining that the first file includes malware, and
the second action including permitting the first file to be accessed based on determining that the first file does not include malware.

3. The non-transitory computer-readable medium of claim 2, where the first action includes at least one of:
blocking the first file,
preventing the first file from being sent to a client device, or
sending a message indicating that the first file includes malware.

4. The non-transitory computer-readable medium of claim 1, where the one or more instructions, when executed by the one or more processors, further cause the one or more processors to:
determine that the first file or the second file causes a third file to be downloaded; and
determine a third malware score for the third file based on at least one of:
the first malware score for the first file, or
the second malware score for the second file.

5. The non-transitory computer-readable medium of claim 1, where the one or more instructions, when executed by the one or more processors, further cause the one or more processors to:
determine that the first file or the second file causes a third file to be downloaded; and
determine that the third file and the second file share a threshold degree of similarity,
the third file not being analyzed for malware independently of analyzing the second file for malware based on determining that the third file and the second file share the threshold degree of similarity.

6. The non-transitory computer-readable medium of claim 1, where the one or more instructions, when executed by the one or more processors, further cause the one or more processors to:
determine that the first file or the second file causes a third file to be downloaded;
determine that the third file and the second file share a threshold degree of similarity; and
modify the first malware score for the first file based on determining that the third file and the second file share the threshold degree of similarity.

7. The non-transitory computer-readable medium of claim 1, where the one or more instructions, when executed by the one or more processors, further cause the one or more processors to:
determine, based on the second malware score, whether the second file includes malware; and
selectively perform a first action or a second action based on determining whether the second file includes malware,
the first action including counteracting the second file based on determining that the second file includes malware, and
the second action including permitting the second file to be accessed based on determining that the second file does not include malware.

8. A device, comprising:
one or more processors to:
analyze a first file for malware;
determine that the first file causes a second file to be downloaded,
the second file being different from the first file;
store linkage information that identifies a relationship between the first file and the second file based on determining that the first file causes the second file to be downloaded;
analyze the second file for malware;
determine a malware base score based on analyzing the first file for malware;
determine a malware feedback score based on analyzing the second file for malware and based on the linkage information;
determine a first malware score for the first file based on the malware base score and the malware feedback score; and
determine a second malware score for the second file based on analyzing the first file for malware and based on the linkage information.

9. The device of claim 8, where the one or more processors are further to:
determine, based on the second malware score, that the second file includes malware; and
store an indication that the second file includes malware based on determining that the second file includes malware.

10. The device of claim 8, where the one or more processors are further to:
    determine that the first file causes a third file to be downloaded,
        the third file being different from the first file; and
    determine a third malware score for the third file based on at least one of:
        the second malware score for the second file, or
        the first malware score for the first file.

11. The device of claim 8, where the one or more processors are further to:
    determine that the first file causes a third file to be downloaded,
        the third file being different from the first file; and
    determine that the third file and the second file share a threshold degree of similarity,
        the third file not being analyzed for malware based on determining that the third file and the second file share the threshold degree of similarity.

12. The device of claim 8, where the one or more processors are further to:
    determine that the first file causes a third file to be downloaded,
        the third file being different from the first file;
    determine that the third file and the second file share a threshold degree of similarity; and
    modify the second malware score for the second file based on determining that the third file and the second file share the threshold degree of similarity.

13. The device of claim 8, where the one or more processors are further to:
    determine, based on the first malware score, that the first file includes malware; and
    perform an action to counteract the first file based on determining that the first file includes malware,
        the action including at least one of:
            blocking the first file,
            preventing the first file from being sent to a client device, or
            sending a message indicating that the first file includes malware.

14. The device of claim 8, where the one or more processors are further to:
    determine, based on the second malware score, that the second file includes malware; and
    perform an action to counteract the second file based on determining that the second file includes malware,
        the action including at least one of:
            blocking the second file,
            preventing the second file from being sent to a client device, or
            sending a message indicating that the second file includes malware.

15. A method, comprising:
    analyzing, by a device, a first file for malware;
    determining, by the device, that the first file causes a second file to be downloaded,
        the second file being different from the first file;
    storing, by the device, linkage information that identifies a relationship between the first file and the second file based on determining that the first file causes the second file to be downloaded;
    analyzing, by the device, the second file for malware;
    determining, by the device, a malware base score based on analyzing the first file for malware;
    determining, by the device, a malware feedback score based on analyzing the second file for malware and based on the linkage information;
    determining, by the device, a first malware score for the first file based on the malware base score and the malware feedback score; and
    determining, by the device, a second malware score for the second file based on analyzing the first file for malware and based on the linkage information.

16. The method of claim 15, where the first malware score indicates a likelihood that the first file includes malware; and
    where the second malware score indicates a likelihood that the second file includes malware.

17. The method of claim 15, further comprising:
    determining that the first file or the second file causes a third file to be downloaded; and
    determining a third malware score for the third file based on the second malware score for the second file.

18. The method of claim 15, further comprising:
    determining that the first file causes a third file to be downloaded; and
    determining that the third file and the second file share a threshold degree of similarity,
        the third file not being analyzed for malware independently of analyzing the first file for malware and independently of analyzing the second file for malware based on determining that the third file and the second file share the threshold degree of similarity.

19. The method of claim 15, further comprising:
    determining that the first file causes a third file to be downloaded;
    determining that the third file and the second file share a threshold degree of similarity; and
    modifying at least one of the first malware score for the first file or the second malware score for the second file based on determining that the third file and the second file share the threshold degree of similarity.

20. The method of claim 15, further comprising:
    determining, based on the first malware score, that the first file includes malware; and
    performing an action to counteract the first file based on determining that the first file includes malware,
        the action including at least one of:
            blocking the first file,
            preventing the first file from being sent to a client device, or
            sending a message indicating that the first file includes malware.

* * * * *